United States Patent
Miyao et al.

(10) Patent No.: US 12,422,572 B2
(45) Date of Patent: Sep. 23, 2025

(54) SCINTILLATOR PANEL, RADIATION DETECTOR USING SAME, LINE CAMERA AND RADIATION INSPECTION DEVICE, AND INLINE INSPECTION METHOD AND INSPECTION METHOD USING SAME

(71) Applicant: Toray Industries, Inc., Tokyo (JP)

(72) Inventors: Sho Miyao, Otsu (JP); Takahiro Murai, Otsu (JP); Yasuhiro Kobayashi, Otsu (JP); Nobuyasu Fujioka, Otsu (JP)

(73) Assignee: Toray Industries, Inc., Tokyo (JP)

( * ) Notice: Subject to any disclaimer, the term of this patent is extended or adjusted under 35 U.S.C. 154(b) by 386 days.

(21) Appl. No.: 18/015,384

(22) PCT Filed: Jul. 20, 2021

(86) PCT No.: PCT/JP2021/027073
§ 371 (c)(1),
(2) Date: Jul. 13, 2023

(87) PCT Pub. No.: WO2022/024860
PCT Pub. Date: Feb. 3, 2022

(65) Prior Publication Data
US 2024/0069220 A1  Feb. 29, 2024

(30) Foreign Application Priority Data

Jul. 31, 2020 (JP) .................. 2020-129974
Jul. 31, 2020 (JP) .................. 2020-129975

(51) Int. Cl.
*G01T 1/20* (2006.01)
*G01T 1/203* (2006.01)

(52) U.S. Cl.
CPC .......... *G01T 1/2012* (2013.01); *G01T 1/2033* (2013.01)

(58) Field of Classification Search
CPC ........................ G01T 1/2012; G01T 1/2033
See application file for complete search history.

(56) References Cited

U.S. PATENT DOCUMENTS

| | | | |
|---|---|---|---|
| 9,484,481 B2 | 11/2016 | Kondo et al. | |
| 2013/0193329 A1 | 8/2013 | Srivastava et al. | |

(Continued)

FOREIGN PATENT DOCUMENTS

| | | | |
|---|---|---|---|
| CN | 116995083 A | * 11/2023 | |
| JP | 04212100 A | 8/1992 | |

(Continued)

OTHER PUBLICATIONS

The extended European Search Report issued Jun. 27, 2024, by the European Patent Office in corresponding European Patent Application No. 21849944.0-1014. (7 pages).

(Continued)

*Primary Examiner* — David P Porta
*Assistant Examiner* — Fani Polyzos Boosalis
(74) *Attorney, Agent, or Firm* — Buchanan Ingersoll & Rooney PC

(57) ABSTRACT

Provided is a scintillator panel with reduced deterioration in brightness due to irradiation and higher brightness. A scintillator panel including a substrate and a scintillator layer containing phosphors, in which the scintillator layer includes a binder resin having a π-conjugated structure composed of seven or more atoms; in which the glass transition temperature of the binder resin is from 30 to 430° C.; and the thickness of the scintillator layer is from 50 to 800 μm.

13 Claims, 1 Drawing Sheet

(56) References Cited

U.S. PATENT DOCUMENTS

| | | | |
|---|---|---|---|
| 2015/0316660 A1* | 11/2015 | Arimoto | ............... G01T 1/2023 |
| | | | 250/488.1 |
| 2018/0106908 A1 | 4/2018 | Matsusaka et al. | |
| 2019/0025442 A1 | 1/2019 | Sawamoto et al. | |
| 2019/0219712 A1* | 7/2019 | Hagiwara | ................. G01T 1/20 |
| 2022/0043170 A1 | 2/2022 | Tanino et al. | |

FOREIGN PATENT DOCUMENTS

| | | | |
|---|---|---|---|
| JP | 2002303697 A | | 10/2002 |
| JP | 2003240899 A | | 8/2003 |
| JP | 2008051626 A | * | 3/2008 |
| JP | 2011007552 A | | 1/2011 |
| JP | 2016038324 A | | 3/2016 |
| JP | 2016-085194 A | | 5/2016 |
| JP | 2018061753 A | | 4/2018 |
| JP | 2019023579 A | | 2/2019 |
| JP | 2019194580 A | * | 11/2019 |
| WO | WO-2020153049 A1 | * | 7/2020 ........... A61B 6/4216 |

OTHER PUBLICATIONS

International Search Report and Written Opinion for International Application No. PCT/JP2021/027073, dated Oct. 19, 2021, 7 pages.
Office Action (Notice of Reasons for Refusal) issued Feb. 25, 2025, by the Japan Patent Office in corresponding Japanese Patent Application No. 2021-542359 and an English translation of the Office Action. (10 pages).

* cited by examiner

SCINTILLATOR PANEL, RADIATION DETECTOR USING SAME, LINE CAMERA AND RADIATION INSPECTION DEVICE, AND INLINE INSPECTION METHOD AND INSPECTION METHOD USING SAME

CROSS REFERENCE TO RELATED APPLICATIONS

This is the U.S. National Phase application of PCT/JP2021/027073, filed Jul. 20, 2021 which claims priority to Japanese Patent Application No. 2020-129974, filed Jul. 31, 2020 and Japanese Patent Application No. 2020-129975, filed Jul. 31, 2020, the disclosures of each of these applications being incorporated herein by reference in their entireties for all purposes.

FIELD OF THE INVENTION

The present invention relates to scintillator panels, radiation detectors using the same, line cameras and radiation inspection devices, and in-line inspection methods and inspection methods using the same.

BACKGROUND OF THE INVENTION

Detection methods using films have been widely used heretofore in fields involving inspection with X-ray images. However, since X-ray images captured using films provide analog image information, in recent years, digital radiation detectors such as flat panel radiation detectors (flat panel detector: FPD) have been developed.

Indirect conversion FPDs use scintillator panels to convert X-rays into visible light. Scintillator panels have a scintillator layer containing phosphors such as gadolinium oxysulfide (GOS), and the phosphors emit light in response to X-ray radiation. Light emitted from a scintillator panel is converted into electrical signals by using a sensor (photoelectric conversion layer) having a thin-film transistor (TFT) or a charge coupled device (CCD) to convert information as X-rays into digital information images.

X-ray detectors that are radiation detectors using X-rays as radiation are required to have high brightness. The detectors are also required to have excellent adhesiveness between the scintillator panels and supports from the viewpoint of durability. Thus, it has been considered to devise phosphor particles or binder resins included in scintillator layers (see, for example, Patent Documents 1 to 3).

PATENT LITERATURE

Patent Document 1: JP 2019-194580 A
Patent Document 2: JP 2019-23579 A
Patent Document 3: JP 2016-38324 A

SUMMARY OF THE INVENTION

In-line inspection for foods, electronic parts, or the like in industrial applications is required to shorten the inspection time needed per one product (tact time). As methods for shortening the tact time, methods in which inspection is conducted while performing continuous radiation with X-rays are employed. However, the technologies described in Patent Documents 1 to 3 have shown reduced brightness during the period of use of the detectors due to continuous X-ray irradiation.

Finally, the present inventors have found, as the results of investigation, that the problems described above arise from deterioration (for example, coloring) caused by the binder resin in the scintillator layer being used under high-dose irradiation conditions.

In view of the problems described above, the present invention is aimed to provide a scintillator panel with reduced deterioration in brightness due to irradiation and higher brightness.

Solution to Problem

That is, the present invention according to exemplary embodiments provides a scintillator panel comprising a substrate and a scintillator layer containing phosphors, wherein the scintillator layer includes a binder resin having a π-conjugated structure composed of seven or more atoms;
  wherein the glass transition temperature of the binder resin is from 30 to 430° C.; and
  wherein the thickness of the scintillator layer is from 50 to 800 μm.

According to embodiments of the present invention, a scintillator panel with higher brightness and excellent radiation resistance can be obtained.

DETAILED DESCRIPTION OF EMBODIMENTS OF THE INVENTION

Preferred configuration of scintillator panels according to embodiments of the present invention and radiation detectors using them will be described below as appropriate with reference to the drawings; however, the present invention is not limited thereto.

The scintillator panel according to embodiments of the present invention comprises at least a substrate and a scintillator layer. The scintillator layer absorbs the energy of incident X-rays or other radiation, and emits electromagnetic waves, that is, in the wavelength range of 300 nm to 800 nm, that is, mainly visible light, ranging from ultraviolet light to infrared light.

The scintillator layer comprises at least phosphors and a binder resin having a π-conjugated structure composed of seven or more atoms. The phosphors act to absorb the energy of X-rays or other radiation and emit light. The binder resin act to hold a plurality of the phosphor particles, fixing the relative position of the phosphor particles in the scintillator layer.

Figure 1:
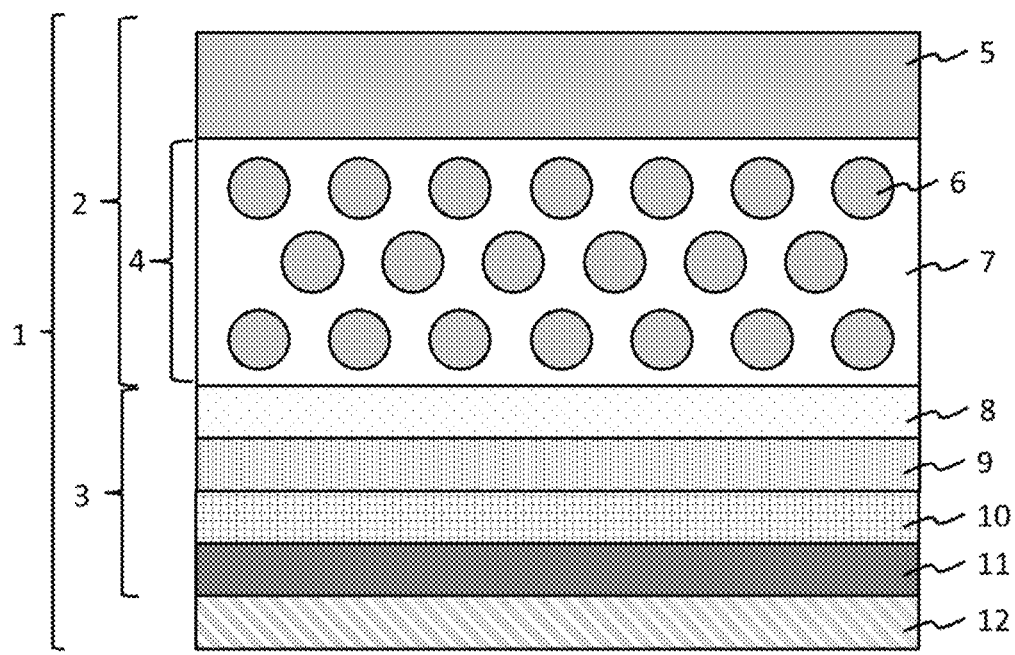
FIG. 1 is a sectional view schematically showing an X-ray detector comprising a scintillator panel according to embodiments of the present invention.

FIG. 1 schematically shows one embodiment of the X-ray detector comprising a scintillator panel of the present invention. An X-ray detector 1 comprises a scintillator panel 2, an output board 3, and a power source part 12.

The scintillator panel 2 comprises a substrate 5 and a scintillator layer 4. The scintillator layer 4 comprises phosphors 6 and a binder resin 7.

The output board 3 comprises a photoelectric conversion layer 9 and an output layer 10 on a board 11. The photoelectric conversion layer 9 typically is one comprising pixels with a photosensor that is not shown in the figure, for example, a photoelectric conversion layer in which pixels arranged in a matrix manner, facing on a scintillator layer 4. A diaphragm layer 8 may be provided on the photoelectric conversion layer 9. The light exit surface of the scintillator panel 2 and the photoelectric conversion layer 9 of the output board 3 are preferably bonded or adhered via a diaphragm layer 8.

Figure 2:
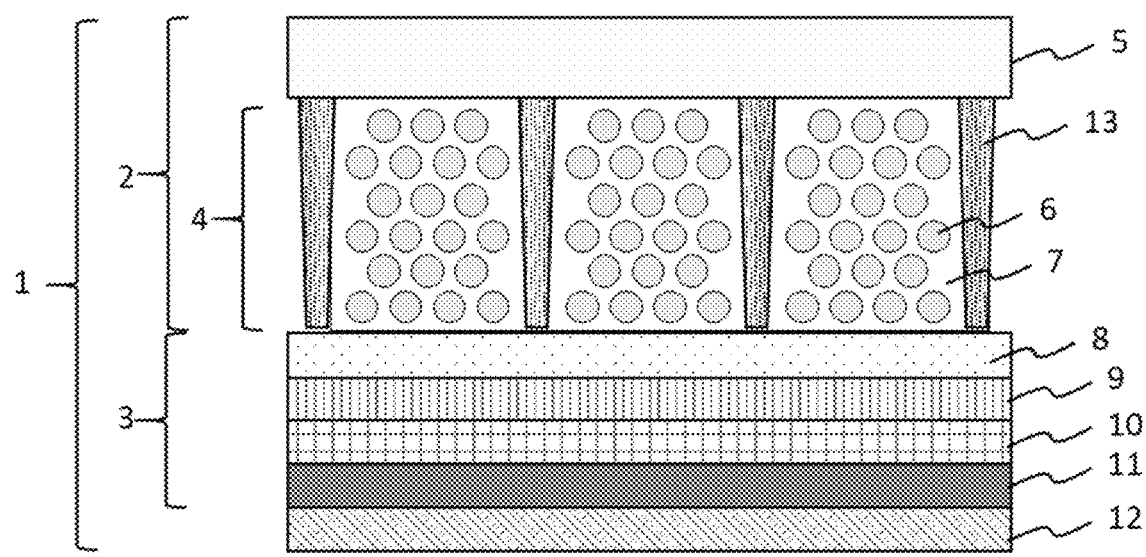
FIG. 2 is a sectional view schematically showing an X-ray detector comprising a scintillator panel having a scintillator layer divided by barrier ribs according to one aspect.

FIG. 2 schematically shows another embodiment of the X-ray detector 1 comprising a scintillator panel of the present invention. An X-ray detector 1 comprises a scintillator panel 2, an output board 3, and a power source part 12.

The scintillator panel 2 comprises a substrate 5, and a scintillator layer 4 that is divided by barrier ribs 13. The scintillator layer 4 comprises phosphors 6 and a binder resin 7. The output board 3 comprises a photoelectric conversion layer 9 and an output layer 10 on a board 11. The photoelectric conversion layer 9 typically is one comprising pixels with a photosensor that is not shown in the figure. A diaphragm layer 8 may be provided on the photoelectric conversion layer 9. Light emitted from the scintillator layer 4 reaches the photoelectric conversion layer 9, then photoelectrically converted and output.

(Binder Resin)

The binder resin contained in the scintillator layer has a π-conjugated structure composed of seven or more atoms. By having a rr-conjugated structure composed of seven or more atoms, the binder resin has a structure that is capable of resonance stabilization, which prevents the binder from being discolored due to irradiation. Prevention of discoloring of the binder resin due to irradiation results in prevention of reduced brightness and longer life of the scintillator panel even when the scintillator panel is used under high-dose irradiation conditions.

A binder resin "has a π-conjugated structure" means that the structure in the resin has alternating single and multiple bonds, with a plurality of multiple bonds present. The phrase "have a π-conjugated structure composed of seven or more atoms" means that in the structure having alternating single and multiple bonds with a plurality of multiple bonds present as described above, seven or more atoms make up the multiple bonds. The number of the atoms making up the π-conjugated structure of the binder resin is, for example, 0 for polymethyl methacrylate, 6 for polystyrene, 10 for polyethylene terephthalate, 6 for polyhydroxystyrene, 6 for polycarbonate, or 14 for poly(4,4'-oxydiphenylenepyromellitimide). Whether the π-conjugated structure consists of seven or more atoms can be determined by determining the structure of the binder resin by a method described later, and then counting the number of the atoms making up the multiple bonds in the structure having alternating single and multiple bonds with a plurality of multiple bonds present.

The binder resin preferably has a π-conjugated structure composed of 30 or less atoms. Inclusion of a π-conjugated structure composed of 30 or less atoms allows for prevention of longer absorption wavelength of the binder resin, resulting in increased transmittance in the visible light region, reduced coloring of the binder resin in an initial period, and further improved brightness.

The transmittance of a solution containing 2.5% by weight of the binder resin used in the present invention at an optical path length of 1 cm and a wavelength of 400 nm is preferably 85% or more, and more preferably 90% or more. When the transmittance of a solution containing 2.5% by weight of the binder resin at an optical path length of 1 cm and a wavelength of 400 nm is 85% or more, coloring of the binder resin in an initial period is reduced. This can prevent light emitted from the phosphors from being absorbed in the binder resin, reducing optical attenuation in the phosphor layer, and further improving the brightness. Here, the transmittance of a solution containing 2.5% by weight of the binder resin at an optical path length of 1 cm and a wavelength of 400 nm is a value measured using an ultraviolet and visible spectrophotometer (for example, U-4100, produced by Hitachi High-Tech Corporation). The solvent of the solution is not particularly limited as long as it dissolves the binder resin uniformly and the transmittance of the solvent alone at an optical path length of 1 cm and a wavelength of 400 nm is 80% or more.

The binder resin used in the present invention preferably has the structure represented by the following general formula (1) or (2) as a repeating unit in its backbone.

[Chem 1]

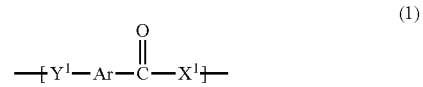

(1)

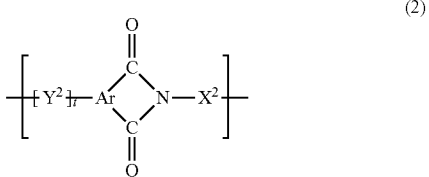

(2)

In the general formulae (1) and (2), $X^1$, $X^2$, $Y^1$, and $Y^2$ each independently represent a divalent organic group. Ar represents an aromatic hydrocarbon group. t represents an integer of 1 or 2.

Since Ar is an aromatic hydrocarbon group, the Ar—C (=O) moiety in in the general formulae (1) and (2) is a structure that can undergo resonance stabilization. The aromatic hydrocarbon group may be substituted or unsubstituted. Preferred substituents for the substituted case include an aliphatic hydrocarbon group, a carboxy group, an amino group, a hydroxy group, an alkoxy group, halogen, and a silyl group. The aromatic hydrocarbon group, including substituents, preferably has 6 to 25 carbon atoms.

Specific examples of the aromatic hydrocarbon group include a phenylene group, a naphthylene group, an anthracenylene group, and a phenanthrenylene group. Two or more of these may be contained. Of these, from the viewpoint of solvent solubility, transparency, and color of the resin, a phenylene group or a naphthylene group is preferable, and a phenylene group is particularly preferable. Specific examples of Ar include divalent groups derived from these groups for the general formula (1); and tri- to tetra-valent groups derived from these groups for the general formula (2).

In the general formula (1), $X^1$ is a divalent organic group. The divalent organic group is preferably a substituted or unsubstituted hydrocarbon group, a substituted or unsubstituted diol-derived organic group, a substituted or unsubstituted diamine-derived organic group, or a group combining two or more thereof.

The hydrocarbon group may be an aliphatic hydrocarbon group, or an aromatic hydrocarbon group. The aliphatic hydrocarbon group may be linear or branched, and may be partially or entirely cyclic. In addition, the aliphatic hydrocarbon group may be a saturated hydrocarbon group or an unsaturated hydrocarbon group. At least some hydrogen in the aliphatic hydrocarbon group may be substituted, for example, with halogen. At least some hydrogen in the aromatic hydrocarbon group may be substituted, for example, with halogen. The carbon number of the hydrocarbon group is preferably 2 or more, and more preferably 4 or more. The carbon number of the hydrocarbon group is preferably 25 or less, and more preferably 20 or less.

The term "diol-derived organic group" refers to a residue obtained by removing hydrogen atoms from the two hydroxy groups of diol individually. Examples of the diol include aliphatic diols such as ethylene glycol, 1,4-butanediol, 1,6-hexanediol, trimethylene glycol, tetramethylene glycol, 1,3-propanediol, 2,2-diethyl-1,3-propanediol, 2-n-butyl-2-ethyl-1,3-propanediol, 2,2-isopropyl-1,3-propanediol, 2,2-di-n-butyl-1,3-propanediol, neopentylglycol, hexanediol, 1,4-cyclohexanedimethanol, and 2,2,4,4-tetramethyl-1,3-cyclobutanediol; and aromatic diols such as bisphenol A. Two or more of these may be contained.

The term "diamine-derived organic group" refers to a residue obtained by removing hydrogen atoms from the two amino groups of diamine individually. Examples of the diamine include aliphatic diamines such as 1,6-hexamethylenediamine, 2-methyl-1,5-diaminopentane, 2,2,4-trimethylhexamethylenediamine, 2,4,4-trimethylhexamethylenediamine, 1,9-nonamethylenediamine, 1,10-decamethylenediamine, 1,12-decamethylenediamine, 4,4'-diaminodicyclohexylmethane, 3,3'-dimethyl-4,4'-diaminodicyclohexylmethane, 4,4'-diaminodicyclohexylpropane, 4,4'-diamino-3,3'-dimethyldicyclohexylmethane, 1,4-diaminocyclohexane, 1,4-bis(aminomethyl)-cyclohexane, 2,6-bis(aminomethyl)-norbornane, 3-aminomethyl-3,5,5-trimethylcyclohexylamine, bis-(4-amino-3-methyl-cyclohexyl)methane, and isophoronediamine; and aromatic diamines such as m-xylylenediamine, p-xylylenediamine, and bis(4-aminophenyl)propane. Two or more of these may be contained.

In the general formula (1), $Y^1$ is a divalent organic group. Preferred examples of the divalent organic group include a substituted or unsubstituted hydrocarbon group, an ether group, a thioether group, a carbonyl group, a sulfonyl group, an imino group, and a group combining two or more thereof. Of these, from the viewpoint of prevention of discoloring or deterioration of the resin due to irradiation and ease of synthesis, a substituted or unsubstituted hydrocarbon group, an ether group, a carbonyl group, and a group combining two or more thereof are preferable. The substituent for the hydrocarbon group may be, for example, halogen. When $Y^1$ is a hydrocarbon group, the carbon number of the hydrocarbon group is preferably 1 or more, and more preferably 3 or more. The carbon number of the hydrocarbon group is preferably 15 or less, and more preferably 10 or less.

Specific examples of the binder resin having the structure represented by the general formula (1) in its backbone include a polyester resin (for example, when $X^1$ is a diol-derived organic group, and $Y^1$ is a carbonyl group), a polyether ether ketone resin (for example, when $X^1$ is a hydrocarbon group, and $Y^1$ is a group combining an ether group and a hydrocarbon group), and a polyamide resin (for example, when $X^1$ is a diamine-derived organic group, and $Y^1$ is a carbonyl group).

In the general formula (2), $X^2$ is a divalent organic group. Preferred examples of the divalent organic group include a substituted or unsubstituted hydrocarbon group, and a group combining a substituted or unsubstituted hydrocarbon group and one or more group selected from the group consisting of an ether group, a thioether group, an ester group, a carbonyl group, a sulfonyl group, an imino group, and an amide group.

Of these, a substituted or unsubstituted hydrocarbon group, or a group combining a substituted or unsubstituted hydrocarbon group and an ether group and/or a sulfonyl group is preferable. Specific examples thereof include the structures as shown below:

[Chem 2]

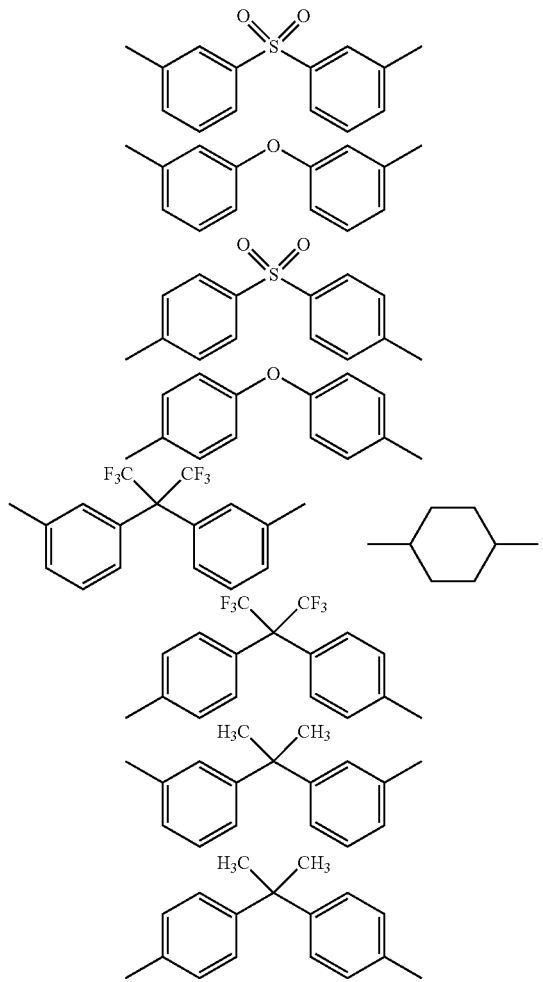

In the general formula (2), $Y^2$ is a divalent organic group. Preferred examples of the divalent organic group include a substituted or unsubstituted hydrocarbon group, an ether group, a thioether group, an ester group, a carbonyl group, a sulfonyl group, an imino group, an amide group, an imido group, and a group combining two or more thereof. Of these, from the viewpoint of prevention of discoloring or deterioration of the resin due to irradiation, a substituted or unsubstituted hydrocarbon group, an ether group, an ester group, a sulfonyl group, a carbonyl group, an amide group, an imido group, and a group combining two or more thereof are preferable. The carbon number of the hydrocarbon group is preferably from 1 to 8. When t is 2 in the general formula (2), the plurality of $Y^2$ may be the same as or different to each other. In addition, the plurality of $Y^2$ may form a cyclic structure.

Specific examples of the binder resin having the structure represented by the general formula (2) in its backbone include a polyimide resin (for example, when $Y^2$ is an imido group), a polyetherimide resin (for example, when $Y^2$ is a group combining an ether group and a hydrocarbon group and an imido group), and a polyamide imide resin (for example, when $Y^2$ comprises an amide group).

The resin structures represented by the general formulae (1) and (2) can be determined by a method of assigning peaks detected using a nuclear magnetic resonance apparatus (NMR).

The binder resin used in the present invention is preferably amorphous. When the binder resin is amorphous, a better solvent solubility is obtained, allowing for uniform mixing of phosphors and a binder resin in a method of producing a scintillator panel described later, and thus uniform formation of a phosphor layer. Thus, local deterioration of the brightness of the scintillator panel due to coloring of the binder resin can be prevented. In addition, no high-temperature heating step is needed in the manufacturing process of the scintillator panel as compared to resins that require to be melt by heat, such as hot-melt resins, so that the substrate can be more easily selected, and deterioration, such as discoloring, of the binder resin during heating at high temperatures can be reduced. This allows for further improvement in the brightness of the scintillator panel. As used herein, the term "amorphous" means that a binder resin, when analyzed by a powder X-ray diffractometry, shows substantially no peak contributed by crystal structures, but only shows a broad halo.

The glass transition temperature of the binder resin used in embodiments of the present invention is from 30 to 430° C. The lower limit of the glass transition temperature is 30° C., and preferably 40° C. or more. When the glass transition temperature of the binder resin is 30° C. or more, generation of radicals in the binder resin caused by irradiation, and intermolecular crosslinking, cleavage, or decomposition associated with it can be reduced. This allows for prevention of coloring or change in the structure of the binder resin due to reactions between cleavage sites and other molecules. Thus, deterioration of the brightness of the scintillator panel due to coloring of the binder resin, or deformation of the scintillator panel associated with deterioration of the mechanical properties of the binder resin can be prevented.

On the other hand, the upper limit of the glass transition temperature of the binder resin is 430° C., more preferably 270° C. or less, and still more preferably 260° C. or less. When the glass transition temperature is higher than 430° C., the binder resin is more likely to be colored even before X-ray irradiation, which decreases the brightness.

In the present invention, the glass transition temperature of the binder resin is a value measured using a differential thermal analyzer (for example, a differential type differential thermal balance TG8120; Rigaku Corporation).

In the present invention, the weight average molecular weight (Mw) of the binder resin is preferably in the range from 5,000 to 100,000. When the weight average molecular weight Mw of the binder resin is 5,000 or more, the binder resin has sufficient strength to hold phosphors, which can prevent chipping or cracking of the scintillator layer, or deterioration of the brightness. In addition, the binder resin is less susceptible to changes in the molecular structure due to irradiation, which allows for prevention of discoloring or deterioration of the mechanical properties of the scintillator panel. When the Mw of the binder resin is 100,000 or less, phosphor particles can be packed with high density, which improves the brightness.

The dispersion (Mw/Mn) of the binder resin obtained by dividing its weight average molecular weight (Mw) by its number average molecular weight (Mn) is preferably from 1.5 to 5.0. When the dispersion of the binder resin is 1.5 or more, the production yield of the binder resin can be improved. When the dispersion of the binder resin is 5.0 or less, occurrence of insoluble components in the solvent can be prevented, and thus the variation of the brightness in the scintillator layer can be prevented.

Here, the weight average molecular weight (Mw) and number average molecular weight (Mn) of the binder resin refer to molecular weights measured and calculated by a gel permeation chromatography (GPC), which are values converted based on a polystyrene sample with known molecular weight. Specifically, the molecular weights can be measured by using a gel permeation chromatography GPC (GPC-22)/refractive index detector RI (RI-8020, manufactured by Tosoh Corporation), and can be calculated using monodisperse polystyrene (manufactured by Tosoh Corporation) as a standard.

The binder resin used in the present invention preferably has an energy level gap Eg between the highest occupied molecular orbital and the lowest unoccupied molecular orbital of from 2.0 eV to 4.2 eV, and more preferably from 2.7 eV to 4.1 eV. When the Eg of the binder resin is 2.0 eV or more, light emitted from the phosphors can be prevented from being absorbed in the binder resin, resulting in reduced optical attenuation in the phosphor layer and further improved brightness. When the Eg of the binder resin is 4.2 eV or less, the energy that is released when electrons excited with radiation in the binder resin return to the ground state is about the same as, or less than the average binding energy between atoms that constitute the binder resin, so that the probability of interatomic bonds in the binder resin being dissociated can be reduced. This allows for reduction of the probability of generation of radicals in the binder resin and/or reduction of the reactivity of generated radicals, thus preventing coloring of the binder resin caused by reactions due to radicals and further preventing deterioration of the brightness.

In the present invention, Eg of the binder resin is a value calculated using Tauc plot. Specifically, the optical constants against wavelengths (refractive index n, and extinction coefficient k) are determined using a spectroscopic ellipsometer (for example, FE-5000; manufactured by Otsuka Electronics Co., Ltd.), and the absorption coefficient $\alpha$ is calculated from the extinction coefficient k. The energy E at each wavelength is plotted on the x-axis, and $(E\alpha)^2$ on the y-axis (Tauc plot). By drawing a tangent line through the inflection point to the S-shaped upward curve obtained by the plot, the point of intersection of the tangent line and the x-axis is obtained as Eg. It is noted that when there is a baseline apart from the x-axis in the Tauc plot, the point of intersection of the tangent line and the baseline is Eg.

The scintillator layer may comprise other binder resins than those described above without impairing the effects of the present invention. Examples of such binder resins include acrylic resins, cellulose resins, epoxy resins, melamine resins, phenolic resins, urea resins, vinyl chloride resins, butyral resins, polyvinyl acetal, silicone resins, polyester resins, polyamide resins, polyimide resins, polyamide imide resins, polycarbonate resins, polyketone resins, polyether resins, polyethylene, polypropylene, polycarbonate, polystyrene, polyvinyl toluene, polyvinylpyrrolidone, polyacrylamide, polyvinyl acetate, aromatic hydrocarbon resins, polyalkylenepolyamine resins, polybenzimidazole resins, polypyrrole resins, and polythiophene resins.

(Phosphor)

The phosphors used in the scintillator panel of the present invention may be preferably substances that emit light in the range from ultraviolet to infrared light, mainly visible light, upon irradiation, and may be, for example, either inorganic or organic phosphors.

Examples of the inorganic phosphors include sulfide phosphors, germanate phosphors, halide phosphors, barium sulfate phosphors, hafnium phosphate phosphors, tantalate phosphors, tungstate phosphors, rare-earth silicate phosphors, rare-earth oxysulfide phosphors, rare-earth phosphate phosphors, rare-earth oxyhalide phosphors, alkaline earth metal phosphate phosphors, and alkaline earth metal fluorohalide phosphors.

The rare-earth silicate phosphors include cerium-activated rare-earth silicate phosphors; the rare-earth oxysulfide phosphors include praseodymium-activated rare-earth oxysulfide phosphors, terbium-activated rare-earth oxysulfide phosphors, and europium-activated rare-earth oxysulfide phosphors; the rare-earth phosphate phosphors include terbium-activated rare-earth phosphate phosphors; the rare-earth oxyhalogen phosphors include terbium-activated rare-earth oxyhalide phosphors, and thulium-activated rare-earth oxyhalide phosphors; the alkaline earth metal phosphate phosphors include europium-activated alkaline earth metal phosphate phosphors; and the alkaline earth metal fluorohalide phosphor include europium-activated alkaline earth metal fluorohalide phosphors.

Examples of the organic phosphors include p-terphenyl, p-quaterphenyl, 2,5-diphenyloxazole, 2,5-diphenyl-1,3,4-oxadiazole, naphthalene, diphenylacetylene, and stilbene.

Two or more of these may be contained. Of these, phosphors selected from rare-earth oxysulfide phosphors are preferable. Among rare-earth oxysulfides, gadolinium oxysulfide is preferable in view of luminance efficiency and chemical stability, in view of luminance efficiency and chemical stability. Gadolinium oxysulfide is preferably terbium-activated, europium-activated, or praseodymium-activated.

Examples of the shape of phosphors include particulate, columnar, and scaly. Of these, particulate phosphors are preferable. When the shape of the phosphors is particulate, the phosphors are more uniformly dispersed in the scintillator layer, thereby preventing uneven emission from phosphors in the scintillator layer and enabling uniform emission.

The mean particle size of the phosphors is from 0.5 to 50 µm, more preferably from 3.0 to 40 µm, and still more preferably from 4.0 to 30 µm. When the mean particle size of the phosphors is 0.5 µm or more, the conversion efficiency from radiation to visible light can be further improved, and the brightness can be further improved. In addition, aggregation of the phosphors can be prevented. On the other hand, when the mean particle size of the phosphors is 50 µm or less, the surface of the scintillator layer is excellent in smoothness, and the generation of bright spots on images can be prevented.

Here, the mean particle size of the phosphors in the present invention refers to a particle size of 50 percentile point in the particle size cumulative distribution, and can be measured using a particle size distribution analyzer (for example, MT3300; manufactured by Nikkiso Co., Ltd.). More specifically, phosphors are charged into a sample chamber filled with water, and subjected to ultrasonic treatment for 300 seconds, followed by measurement of the particle size distribution. The mean particle size is determined as the particle size of 50 percentile in the cumulative distribution.

The time required for the emission intensity of the phosphors to be 1/e times the initial emission intensity is preferably 100 microseconds or less. When the time required to reach 1/e times is 100 microseconds or less, in an inspection method for continuously imaging objects comprising in-line inspection as described later, remaining of the X-ray images of the objects in the images of the following objects can be prevented. Thus, a fast and continuous test is provided. The decay time of the emission intensity of the phosphors can be measured by known methods, and specific examples thereof include methods using ultraviolet light as an excitation light with a fluorescence lifetime measuring system (for example, Quantaurus-Tau C11367-24; Hamamatsu Photonics K. K.), and methods using radiation as an excitation source with a system comprising an optical fiber, a photodiode, and a photosensor amplifier. Methods of shortening the decay time of the emission intensity of the phosphors, for example in the case of gadolinium oxysulfide, include methods using a different activator than terbium. Especially when praseodymium is activated, the decay time is shortened.

The volume ratio of the phosphors and the binder resin in the scintillator layer is as following: phosphors:binder resin=80:20 to 95:5. When the volume proportion of the phosphors is 80% or more, the amount of the binder resin that would be discolored due to irradiation is decreased, and thus the attenuation of light emitted inside the scintillator layer can be reduced, resulting in further improved brightness. The volume ratio of the phosphors to the binder resin is more preferably as following: phosphor:binder resin=83:17 to 95:5, and still more preferably as following: phosphor:binder resin=85:15 to 95:5. On the other hand, when the volume proportion of the phosphors is 95% or less, the binding strength between the phosphor particles via the binder resin can be maintained even after irradiation, and thus the scintillator layer can be prevented from chipping and cracking, resulting in further improved adhesion strength between the substrate and the scintillator layer. In addition, the dispersion of the phosphors in formation of the scintillator layer can be improved, and thus the variation of the brightness across the scintillator layer can be reduced.

(Other Components in Scintillator Layer)

The scintillator layer may comprise a dispersant. Inclusion of a dispersant can prevent aggregation or precipitation of phosphor particles in a phosphor paste as described later, providing longer pot life. In addition, the phosphor particles can be kept in a uniform dispersion condition in the phosphor paste, so that biased distribution of the phosphor particles in the scintillator layer can be prevented, and thus variation in the brightness across the scintillator layer can be prevented. The dispersant preferably has an anionic functional group, and more preferably has a carboxy group, a sulfone group, and/or a phosphate group.

The scintillator layer may further comprise a dispersant, a plasticizer, a crosslinking agent, a surface additive, an antistatic agent, metallic compound particles, and/or other agents.

The thickness of the scintillator layer is preferably thicker in order to allow more phosphors to emit light and improve the brightness. The thickness can be appropriately set depending on the quality of X-rays, and is from 50 to 800 µm in accordance with the present invention, more preferably from 70 to 600 µm, and still more preferably from 100 to 400 µm. When the thickness is 50 µm or more, the particle size of the phosphors can be selected based on the thickness without impairing the effects of the present invention with respect to the influence of discoloring of the binder resin due to irradiation, so that reduction of the brightness can be prevented. When the thickness is 800 µm or less, the optical path length of light emitted in the scintillator layer, in particular of light emitted on the substrate side, to the photoelectric conversion layer is short, and thus the influence of discoloring of the binder resin due to irradiation is reduced. Thus, attenuation of light in the scintillator layer can be reduced, and reduction of brightness can be prevented. Deterioration of the mechanical properties due to irradiation can also be prevented, and thus reduction of the binding strength between the phosphors via the binder resin, and of adhesion strength between the substrate and the scintillator layer can be prevented. Within the range described above, thickness uniformity is also excellent, and thus the influence of the variation of the brightness due to the unevenness on the surface of the scintillator layer relative to the thickness is reduced.

When the scintillator layer has a laminated structure of two or more layers, the relationship between the thickness Td of the scintillator layer on the substrate side (lower scintillator layer) and the thickness Tt of the scintillator layer stacked thereon (upper scintillator layer) preferably is Tt/(Td+Tt) in the range from 0.4 to 0.9, and more preferably from 0.6 to 0.9.

The lightness L* of the scintillator panel of the present invention is preferably 75 or more, and more preferably 80 or more. When the lightness L* is 75 or more, attenuation of light emitted from the phosphors in the scintillator layer can be reduced, and thus the brightness is further improved.

The chromaticity a* of the scintillator panel of the present invention is preferably from −10.0 to 10.0, and more preferably from −6.0 to 6.0. When the chromaticity a* is from −10.0 to 10.0, attenuation of light emitted from the phosphors, especially light at wavelengths longer than around 450 nm, in the scintillator layer can be reduced, and thus the brightness is further improved.

The chromaticity b* of the scintillator panel of the present invention is preferably from −15.0 to 15.0, more preferably from −10.0 to 10.0, and still more preferably from −6.0 to 6.0. When the chromaticity b* is from −15.0 to 15.0, attenuation of light emitted from the phosphors, especially light at wavelengths shorter than around 600 nm, in the scintillator layer can be reduced, and thus the brightness is further improved.

(Substrate)

The material making up the substrate used in the scintillator panel of the present invention preferably has high radiolucency, and examples thereof include various glasses, polymer materials, and metals. Examples of the glasses include quartz, borosilicate glass, and chemically strengthened glasses. Examples of the polymer materials include polyesters such as cellulose acetate and polyethylene terephthalate (PET), polyamides, polyimides, triacetates, polycarbonates, and carbon fiber reinforced resins. Examples of the metals include aluminum, iron, and copper. Two or more of these may be used. Of these, polymer materials with high radiolucency are particularly preferable. Materials with excellent flatness and heat resistance are also preferable.

The thickness of the substrate, for example, when using a glass substrate, is preferably 2.0 mm or less, more preferably 1.0 mm or less, and still more preferably 0.5 mm or less from the viewpoint of weight reduction of the scintillator panel. When a substrate made of a polymer material is used, the thickness is preferably 3.0 mm or less, and more preferably 1.0 mm or less. The thickness of the substrate in the present invention can be calculated by cutting out a cross section of the board using a microtome, observing 10 locations using a scanning electron microscope (for example, a field-emission scanning electron microscope "S-4800," manufactured by Hitachi, Ltd.), and determining the average thickness.

The substrate may have a metal layer on its surface on the scintillator layer side. When the substrate has a metal layer, the substrate can have higher reflectance regardless of the color or thickness of the substrate. The metal layer can be formed on the substrate by a known method, and specifically a layer of aluminum, silver, or an alloy thereof can be formed on the surface of the substrate by physical vapor deposition (PVD), chemical vapor deposition (CVD), or other methods.

When using a polymer material as the substrate, polyester is preferably contained as a main component from the viewpoint of reflectance, strength, and heat resistance. As used herein, the term "main component" means a component that is contained in an amount of 50% by mass or more. More preferably, white polyester is used that contains polyester as a main component and further contains materials with different refractive indices.

The polyester refers to a condensation polymer between diol and dicarboxylic acid. Examples of the diol include ethylene glycol, 1,4-butanediol, 1,4-cyclohexanedimethanol, 1,6-hexanediol, trimethylene glycol, and tetramethylene glycol. Examples of the dicarboxylic acid include terephthalic acid, isophthalic acid, 2,6-naphthalenedicarboxylic acid, 4,4'-diphenyldicarboxylic acid, adipic acid, and sebacic acid. Examples of the polyester include polyethylene terephthalate (PET), polytetramethylene terephthalate (PBT), polyethylene-p-oxybenzoate, poly-1,4-cyclohexylenedimethylene terephthalate, and polyethylene-2,6-naphthalenedicarboxylate (PEN).

Examples of the materials with different refractive indices include white pigments such as zinc oxide, zirconium oxide, titanium oxide, gadolinium oxide, and gadolinium oxysulfide; and ceramic particles such as high-refractive-index glasses.

The substrate preferably has high radiolucency, and thus preferably does not contain any elements from Period 6 or more in the periodic table, and more preferably does not contain any elements from Period 5 or more in the periodic table. In particular, a substrate containing elements from Period 4 or less as components has high radiolucency, and thus is suitably used. It is noted in the present invention that not containing high-period elements means that the amount of high-period elements in the substrate is less than 0.1% by mass.

The substrate preferably has low specific gravity from the viewpoint of weight reduction and radiolucency of the scintillator panel. Specifically, the specific gravity of the substrate is preferably 1.2 g/cm$^3$ or less, more preferably 0.9 g/cm$^3$ or less, and still more preferably 0.7 g/cm$^3$ or less. On the other hand, the specific gravity of the substrate is preferably 0.5 g/cm$^3$ or more from the viewpoint of further preventing the occurrence of tears and wrinkles during manufacturing of the substrate, and further improving the handling properties.

The substrate preferably has a highly adhesive layer on its surface on the phosphor layer side. When a highly adhesive layer is included, the adhesion strength between the scintillator layer and the substrate can be further improved.

Examples of the material of the highly adhesive layer include acrylic resins, epoxy resins, urethane resins, and polyester resins. Two or more of these may be contained. Of these, a polyester resin preferably is the main component. A polyester resin with a glass transition temperature of 10 to 80° C. is more preferable. For example, when PET is used as the substrate, aromatic polyester having terephthalic acid, isophthalic acid, or other residue, which has a similar structure to PET is preferable. As the aromatic polyester, a saturated copolymerized polyester with a weight average molecular weight of 2,000 to 30,000 is preferable, and an amorphous solvent-soluble saturated copolymerized polyester with a weight average molecular weight of 2,000 to 30,000 is further preferable. As the amorphous solvent-soluble saturated copolymerized polyester with a weight average molecular weight of 2,000 to 30,000, amorphous solvent-soluble "Nichigo-POLYESTER" (registered trademark) manufactured by The Nippon Synthetic Chemical Industry Co., Ltd. can be suitably used. The glass transition temperature of the resin can be measured using a differential thermal analyzer (for example, differential type differential thermal balance TG8120; manufactured by Rigaku Corporation).

The highly adhesive layer may contain a powder having a different refractive index from the polyester resin that is the main component. When such a powder is contained, light diffusion in the direction parallel to the support can be further reduced. The difference in refractive index Δn between polyester and the powder is preferably 0.2 or more. The powder is preferably an inorganic powder from the viewpoint of the difference in refractive index between the powder and the resin that is a main component of the highly adhesive layer. Examples of the inorganic powder may be those illustrated as the inorganic powder in the surface layer as described above. A titanium oxide powder is particularly preferable from the viewpoint of high refractive index. Here, the refractive index of a polyester resin can be measured by dissolving the polyester resin in an organic solvent that can dissolve the polyester resin, such as methyl ethyl ketone, applying and drying the resulting solution to obtain a resin film, and analyzing the resulting resin film using a refractometer (Abbe refractometer 4T; manufactured by Atago Co., Ltd.; light source: sodium D line; measurement temperature: 25° C.). The refractive indexes of inorganic powders are disclosed, for example, in "Handbook of Inorganic Chemistry" (Gihodo Shuppan Co., Ltd.), "Filler Handbook" (Taisei Shuppan Co., Ltd), and "Handbook of Ceramics" (The Ceramic Society of Japan).

The substrate may have an adhesive layer and a support on the other side of the surface on which the scintillator layer is present. Inclusion of a support results in increased toughness of the substrate during the process of manufacturing the scintillator panel described later, thus preventing the substrate from breaking during handling.

The material forming the support preferably has high radiolucency. Examples of the material include cellulose acetate, polyester, polyamide, polyimide, triacetate, and polycarbonate, and carbon fiber reinforced resins containing these materials and carbon fibers. The material forming the support may be the same as that of the substrate.

Examples of the material forming the adhesive layer include acrylic resins, epoxy resins, urethane resins, and polyester resins. In particular, optically clear adhesive sheets (OCA sheets) obtained by processing an acrylic adhesive material or other material into a sheet are preferable because they can be bonded at low temperatures.

(Barrier Rib)

The scintillator panel of the present invention preferably comprise barrier ribs that divide the scintillator layer.

The material forming the barrier ribs preferably can form barrier ribs with high strength and heat resistance, and may be, for example, an inorganic material or a polymer material. Here, the term "inorganic materials" as used herein refer to some simple carbon compounds (allotropes of carbon such as graphite and diamond) and compounds composed of elements other than carbon. The phrase "composed of an inorganic substance" does not exclude the presence of other components than the inorganic substance in a strict sense, and permits the presence of other compounds than the inorganic substance, such as impurities contained by the inorganic substance itself as a raw material, and impurities that are mixed during the process of manufacturing the barrier ribs.

When the barrier ribs are composed of an inorganic material, it is preferable that glass is the main component. Glass refers to an inorganic amorphous solid containing silicate. When the main component of the barrier ribs is glass, the barrier ribs have increased strength, durability, and heat resistance, making deformation or damaging less likely to be occur during the step of forming a reflecting layer or the step of charging phosphors as described later. In embodiments of the present invention, the phrase "containing glass as the main component" means that 50 to 100% by mass of the materials forming the barrier ribs is glass.

In particular, the proportion of low-softening-point glass that is glass having a softening point of 650° C. or less in the barrier ribs is preferably 95% by volume or more, and more preferably 98% by volume or more, when the volume of the barrier rib part is considered as 100% by volume. When the content of low-softening-point glass is 95% by volume or more, the surface of the barrier ribs is likely to be flattened during a firing step. This makes it easier for the scintillator panel to have a reflecting layer uniformly formed on the surface of the barrier ribs. This can increase the reflectance, further increasing the brightness.

Examples of components that can be used other than low-softening-point glass include high-softening-point glass powders that are glass having a softening point of over 650° C., and ceramic powders. These powders make it easier to control the shape of the barrier ribs during the barrier rib forming step. In order to increase the content of the low-softening-point glass, the content of the other component than the low-softening-point glass is preferably less than 5% by volume.

The barrier ribs, when composed of a polymer material, are preferably composed of one or more compound (P) selected from the group consisting of polyimide, polyamide, polyamide-imide, polybenzoxazole, and acrylic resins. When the barrier ribs are formed with a compound (P), barrier ribs can be formed that are fine, have a high aspect ratio, and have smooth surface. When a photosensitive resin composition is prepared using a compound (P), the components in the photosensitive material are not particularly limited. Examples include photoradically polymerizable negative-type photosensitive resin compositions obtained by adding a multifunctional acrylic monomer and a photoradical polymerization initiator to a compound (P); photocationically polymerizable negative-type photosensitive resin compositions obtained by adding an epoxy compound and a photocationic polymerization initiator to a compound (P); and photo-solubilizable positive-type photosensitive resin compositions obtained by adding a naphthoquinone photosensitizer to a compound (P). Of these, photocationically polymerizable negative-type photosensitive resin compositions containing an epoxy compound are preferable from the viewpoint that barrier ribs having high aspect ratio can be formed.

When the barrier ribs are composed of a compound (P), the compound (P) preferably has a phenolic hydroxy group. When the compound (P) has a phenolic hydroxy group, the resulting solubility of the resin in an alkaline developing solution is appropriate, thus giving high contrast between the exposed portions and the unexposed portions, allowing for formation of desired patterns.

The barrier ribs preferably further contain an epoxy compound. An epoxy compound can further improve the processability without impairing the heat resistance and the mechanical strength of the compound (P), and thus makes it easier to form barrier ribs in a desired shape. Thus, the amount of phosphors charged can be further increased, and the brightness can be further improved.

In order not to impair the properties of the compound (P), the amount of the epoxy compound in the barrier rib is preferably not more than the amount of the compound (P) by mass fraction. When the barrier ribs contain other components than the compound (P) and the epoxy compound, the total amount of them is preferably not more than the total amount of the compound (P) and the epoxy compound by mass fraction.

Known epoxy compounds can be used, including aromatic epoxy compounds, alicyclic epoxy compounds, and aliphatic epoxy compounds.

(Reflecting Layer)

A reflecting layer, in particular a metallic reflecting layer was formed on the surface of the barrier rib and the substrate of the scintillator panel. Inclusion of a reflecting layer allows light emitted from the cells separated by barrier ribs caused by irradiation to efficiently reach the side of the detector, facilitating the improvement of the brightness.

The material forming the reflecting layer is not particularly limited as long as it functions to reflect electromagnetic waves emitted from the phosphors. For example, metallic oxide such as titanium oxide or aluminum oxide, or a metal such as silver or aluminum may be used. Two or more of these may be contained.

The material forming the reflecting layer preferably has high reflectance even when the reflecting layer is a thin film. When the reflecting layer is a thin film, the reduction of the internal volume of the cell can be decreased, resulting in increased amount of the phosphors to be contained, so that the scintillator panel tend to have improved brightness. Thus, the reflecting layer is preferably composed of a metal, and more preferably the metal is silver, aluminum, or an alloy thereof. The metal is a silver alloy containing palladium and copper from the viewpoint of discoloring resistance in the atmosphere.

The thickness of the reflecting layer can be set as appropriate according to the required reflective characteristics, and is not particularly limited. For example, the thickness of the reflecting layer is preferably 10 nm or more, and more preferably 50 nm or more. Furthermore, the thickness of the reflecting layer is preferably 500 nm or less, and more preferably 300 nm or less. When the thickness of the reflecting layer provided on the barrier rib is 10 nm or more, the scintillator panel can have reduced leakage of light passing through the barrier rib and achieve sufficient light shielding properties, resulting in improved sharpness. When the thickness of the reflecting layer is 500 nm or less, projections and depressions on the surface of the reflecting layer are less likely to be large, and thus the reflectance is less likely to be reduced.

The reflecting layer preferably has a protective layer on its surface. Even if the reflecting layer is made of an alloy or other material with poor discoloring resistance in the atmosphere, a protective layer provided can reduce discoloring, preventing the reflectance of the metallic reflecting layer from being reduced due to a reaction between the metallic reflecting layer and the scintillator layer, and further improving the brightness.

(Protective Layer)

Both inorganic protective layer and organic protective layer are suitable as the protective layer. Inorganic protective layer and organic protective layer may be stacked and used in combination as the protective layer.

An inorganic protective layer is suitable as the protective layer because of its low water vapor transmittance. The inorganic protective layer can be formed by a known method such as a spattering method. The material of the inorganic protective layer is not particularly limited. Examples of the material of the inorganic protective layer include oxides such as silicon oxide, indium tin oxide, and gallium zinc oxide, nitrides such as silicon nitride, and fluorides such as magnesium fluoride. Of these, silicon nitride is preferably used as the material of the inorganic protective layer because of low water vapor transmittance and the fact that the reflectance of silver is less likely to be reduced in forming the inorganic protective layer.

The thickness of the inorganic protective layer is not particularly limited. For example, the thickness of the inorganic protective layer is preferably 2 nm or more, and more preferably 5 nm or more. In addition, the thickness of the inorganic protective layer is preferably 300 nm or less, and more preferably 100 nm or less. When the thickness is 2 nm or more, the scintillator panel can have more significant effect of preventing deterioration of brightness under usage environments. When the thickness is 300 nm or less, coloring due to the inorganic protective layer can be prevented, and the brightness can be further improved. The thickness of the inorganic protective layer can be measured by the same method as one for the thickness of the organic protective layer as described later.

The organic protective layer is preferably a polymer compound with excellent chemical durability, and preferably contains, for example, polysiloxane or an amorphous fluorine resin as a main component. As used herein, the term "amorphous fluorine resin" means that a fluorine-containing resin, when analyzed by a powder X-ray diffractometry, shows substantially no peak contributed by crystal structures, but only shows a broad halo.

The organic protective layer can be easily formed by a known method, such as solution coating or spray coating.

The thickness of the organic protective layer is preferably 0.05 µm or more, and more preferably 0.2 µm or more. In addition, the thickness of the organic protective layer is preferably 10 µm or less, and more preferably 5 µm or less. When the thickness of the organic protective layer is 0.05 µm or more, the scintillator panel 2 can have more significant effect of preventing deterioration of brightness. In addition, when the thickness of the organic protective layer is 10 µm or less, the scintillator panel can allow the volumes inside of the cells to be larger, sufficient amount of phosphors to be filled, and the brightness to be further improved. In embodiments of the present invention, the thickness of the organic protective layer can be measured by scanning electron microscopy. It should be noted that organic protective layers formed in a step of forming organic protective layers described later tend to be thinner on the sides near the top of the barrier ribs, and thicker on the sides near the bottom. Thus, when there is such difference in thickness, the thickness of the organic protective layer refers to the thickness on the sides at the middle of the barrier ribs in the height direction.

(Method of Producing Scintillator Panel)

In embodiments of the present invention, the methods of producing scintillator panels specifically include, for example, a method of forming a scintillator layer by applying on a substrate a phosphor paste comprising phosphors, a binder resin having a π-conjugated structure composed of seven or more atoms, and other optional components, and then optionally performing heat drying or exposure.

The method of applying the phosphor paste may be, for example, a screen printing method, or an application method using a bar coater, a roll coater, a die coater, a blade coater, or other coater. Of these, as it is easy to apply a phosphor paste so that the thickness of the scintillator layer is uniform even if the phosphor paste is thick, application using a roll coater or a die coater is preferred. Among die coaters, application method using a slit die coater can adjust the thickness of the scintillator layer with the discharge rate, enabling high-accuracy adjustment of the thickness of the scintillator layer.

The phosphor paste may contain an organic solvent as a component for forming a scintillator layer in addition to the components described above. The organic solvent is preferably a good solvent, for example, for the binder resin having a π-conjugated structure composed of seven or more atoms, and plasticizers, dispersants, and surface additives to be optionally contained. Examples of such an organic solvent include ethylene glycol monobutyl ether acetate, diethylene glycol monobutyl ether acetate, triethylene glycol monobutyl ether acetate, ethylene glycol monobutyl ether, diethylene glycol monobutyl ether, triethylene glycol monobutyl ether, polyethylene glycol monobutyl ether, propylene glycol monomethyl ether acetate, propylene glycol monobutyl ether acetate, dipropylene glycol monobutyl ether acetate, propylene glycol monomethyl ether, propylene glycol monobutyl ether, dipropylene glycol monobutyl ether, ethylene glycol phenyl ether, diethylene glycol phenyl ether, hexylene glycol, isopropyl alcohol, methyl ethyl ketone, cyclohexanone, propyl alcohol, butyl alcohol, terpineol, benzyl alcohol, tetrahydrofuran, dihydroterpineol, γ-butyrolactone, dihydroterpinyl acetate, 3-methoxy-1-butanol, 3-methoxy-3-methyl-1-butanol, 3-methoxy-3-methyl-1-butyl acetate, N,N-dimethylformamide, and N-methyl-2-pyrrolidone. Two or more of these may be contained.

The scintillator layer is preferably formed by heating and drying a phosphor paste coating film. The drying method may be, for example, hot air drying, or IR (infrared light) drying. In drying the phosphor paste coating film, the phosphor paste is heated to reduce the viscosity of the phosphor paste. This can facilitate settling of the phosphors that are materials with relatively high specific gravity in the phosphor paste, and increase the packing density of the phosphors in the scintillator layer. The method of drying the phosphor paste coating film preferably comprise a first step of reducing the amount of the organic solvent remaining in the phosphor paste coating film into less than 40%, and a second step of reducing the organic solvent remaining in the phosphor paste coating film into less than 5%. The heating temperature in the first step is preferably from 35 to 80° C., and the heating time is preferably from 10 to 30 minutes. The heating temperature in the second step is preferably from 35 to 120° C., and the heating time is preferably from 120 to 800 minutes.

(Radiation Detector)

The radiation detector according to embodiments of the present invention comprises the scintillator panel described above on an output board having a photoelectric conversion layer. The output board has a photoelectric conversion layer and an output layer on a board. The photoelectric conversion layer typically is one comprising pixels with a photosensor.

(Line Camera)

The line camera according to embodiments of the present invention comprises the scintillator panel described above on a one-dimensional linear output board having a photoelectric conversion layer. The output board has a photoelectric conversion layer and an output layer on a board. The photoelectric conversion layer typically is one comprising pixels with a photosensor.

(Radiation Inspection Device)

The radiation inspection device according to embodiments of the present invention has a radiation generator that generates radiation and the radiation detector described above. The radiation inspection device directs radiation from the radiation generator to an object and detect radiation passing through the object by the radiation detector. Mounting of a radiation detector of the present invention on the radiation detector can provide a radiation inspection device with high brightness. The radiation inspection device of the present invention may be used in combination with the line camera described above instead of the radiation detector described above.

The radiation detector of the present invention is preferably used in industrial applications. In industrial applications, radiation detectors are continuously exposed to high-energy radiation for extended periods, and thus the doses of radiation received by the radiation detectors are much larger than in medical applications. The scintillator panels provided inside the radiation detectors also receive a significantly larger dose of radiation, which significantly affects the deterioration of the brightness. In these applications, mounting of the radiation detector of the present invention can provide a radiation inspection device with reduced brightness deterioration and higher brightness. The term "industrial applications" as used herein, means those that do not involve direct irradiation to human body, while the term "medical applications" means those that involve direct irradiation to human body for medical purposes.

(In-line Inspection Method)

The in-line inspection method according to embodiments of the present invention uses a radiation inspection device as described above. In-line inspection methods are those for nondestructively and continuously inspecting objects in lines for producing electronic parts, foods, and the like. The radiation inspection device continuously delivers radiation to the radiation detector mounted thereon for an extended period of time. As a radiation inspection device for use therein, the radiation inspection device according to embodiments of the present invention is used to provide an in-line inspection method that can prevent deterioration of the brightness under continuous irradiation environments.

(Off-Line Inspection)

The off-line inspection method according to embodiments of the present invention uses a radiation inspection device as described above. Off-line inspection methods are those for nondestructively and discontinuously inspecting objects in inspection of aircraft components, infrastructure equipment, and the like. For inspection of the internal structures of objects in off-line inspection methods, the tube voltage in the irradiator equipped in the radiation inspection device is preferably higher, and for example, is preferably 70 kV or more. When the tube voltage is 70 kV or more, the amount of radiation transmitted through an object is high, and thus the amount of radiation that can be detected by a radiation detector is sufficient, which enables obtaining radiation images with high brightness. As a radiation inspection device for use therein, the radiation inspection device according to embodiments of the present invention is used to provide an off-line inspection method that can prevent deterioration of the brightness under irradiation environments with high tube voltage.

EXAMPLES

The present invention will be described in more detail below by way of examples and comparative examples; however, the present invention is not limited or interpreted as being limited thereto.

Materials used in Examples and Comparative Examples are shown below. The properties of the materials were measured by the methods as described below.

(Mean Particle Size of Phosphors)

Phosphors were charged into a sample chamber filled with water, of a particle size distribution analyzer (MT3300; manufactured by Nikkiso Co., Ltd.), subjected to ultrasonic treatment for 300 seconds, and then analyzed for the particle size distribution. The mean particle size was determined as the particle size of 50 percentile in the cumulative distribution.

(Glass Transition Temperature of Binder Resin)

About 10 mg of a binder resin was weighed, and analyzed for the temperature profile when it was heated at the rate of 10° C./min from 20° C. under nitrogen atmosphere, using a differential thermal analyzer (differential type differential thermal balance TG8120; manufactured by Rigaku Corporation) using an aluminum pan and a pan lid, from which the glass transition temperature was determined.

(Weight Average Molecular Weight (Mw) and Number Average Molecular Weight (Mn) of Binder Resin)

First, 2.5 mg of a binder resin was dissolved in 5 mL of tetrahydrofuran to prepare a resin solution, and Mw and Mn were determined with gel permeation chromatography GPC (GPC-22) and a refractive index detector RI (type RI-8020, manufactured by Tosoh Corporation) using monodisperse polystyrene (manufactured by Tosoh Corporation) as a standard. The GPC column used was one obtained by connecting two TSKgel GMHxl (manufactured by Tosoh Corporation) and one G2500Hxl (manufactured by Tosoh Corporation), through which a tetrahydrofuran solvent was passed at a rate of 1.0 mL/min.

(Transmittance of Binder Resin Solution)

First, 0.25 mg of a binder resin was dissolved in 9.75 mg of a solvent listed in table 1 to prepare a resin solution. The solution was placed in a quartz cell with an optical path length of 1 cm, and the transmittance at 300 to 800 nm was measured using an ultraviolet and visible spectrophotometer (U-4000, manufactured by Hitachi High-Tech Corporation). The baselines of the resin solutions were corrected with the transmittance of the solvents alone.

(Eg of Binder Resin)

A combination of binder resin and a solvent shown in table 1 was placed in a stirring vessel to 5% by weight, and heated at 60° C. for 8 hours using an oil bath while stirring to prepare a binder resin solution. The binder resin solution was applied on an 8-inch silicon wafer by a spin coating method using a spin coater (MS-B150: manufactured by Mikasa Co., Ltd), and then baked on a hot plate at 100° C. for 5 minutes to prepare a dried film with a thickness of 700 nm. The extinction coefficient of the dried film was measured at 300 to 800 nm using a spectroscopic ellipsometer (FE-5000; manufactured by Otsuka Electronics Co., Ltd.), and Eg was calculated from the Tauc plot.

(Raw Material of Phosphor Paste)

Phosphor powder 1: $Gd_2O_2S$: Tb (manufactured by Nichia Corporation: mean particle size of 11 μm)

Phosphor powder 2: $Gd_2O_2S$: Pr (manufactured by Nichia Corporation: mean particle size of 5 μm).

Binder resin 1: "VYLON" (registered trademark) 103 (number of atoms forming the π-conjugated structure: 10, corresponding to the general formula (1), wherein $X^1$: an organic group derived from ethylene glycol/neopentylglycol, $Y^1$: a carbonyl group, Ar: a phenylene group, glass transition temperature: 47° C., weight average molecular weight: 23,000, polyester resin, Eg=3.9, amorphous) (manufactured by Toyobo Co., Ltd.);

Binder resin 2: "VYLON" (registered trademark) 270 (number of atoms forming the π-conjugated structure: 10, corresponding to the general formula (1), wherein $X^1$: an organic group derived from ethylene glycol/neopentylglycol, $Y^1$: a carbonyl group, Ar: a phenylene group, glass transition temperature: 67° C., weight average molecular weight: 23,000, polyester resin, Eg=3.9, amorphous) (manufactured by Toyobo Co., Ltd.);

Binder resin 3: "U-polymer" (registered trademark) type D (number of atoms forming the π-conjugated structure: 10, corresponding to the general formula (1), $X^1$: an organic group derived from bisphenol A, $Y^1$: a carbonyl group, Ar: a phenylene group, glass transition temperature: 193° C., weight average molecular weight: 60,000, polyalylate resin, Eg=3.5, amorphous) (manufactured by UNITIKA Ltd.);

Binder resin 4: "GRILAMID" (registered trademark) TR55 (number of atoms forming the π-conjugated structure: 10, corresponding to the general formula (1), $X^1$: an organic group derived from 4,4'-diamino-3,3'-dimethyldicyclohexylmethane, $Y^1$: a carbonyl group, Ar: a phenylene group, glass transition temperature: 160° C., weight average molecular weight: 18,000, polyamide resin, Eg=4.1, amorphous) (manufactured by Ems-Chemie (Japan) Ltd.);

Binder resin 5: "VYLOMAX" (registered trademark) HR-15ET (number of atoms forming the π-conjugated structure: 10, corresponding to the general formula (2), $X^2$: an organic group derived from diphenyl ether, t=1, $Y^2$: an amide group, Ar: a group derived from a phenyl group, glass transition temperature: 260° C., weight average molecular weight: 8,000, polyamide imide resin, Eg=3.5, amorphous) (manufactured by Toyobo Co., Ltd.);

Binder resin 6: "S-LEC" (registered trademark) BL-1 (number of atoms forming the π-conjugated structure: 0, not corresponding to the general formula (1) or (2), glass transition temperature: 70° C., weight average molecular weight: 19,000, butyral resin, Eg=3.6, amorphous) (Sekisui Chemical Co., Ltd.);

Binder resin 7: "VYLON" (registered trademark) 630 (number of atoms forming the π-conjugated structure: 10, corresponding to the general formula (1), wherein $X^1$: an organic group derived from ethylene glycol/neopentylglycol, $Y^1$: a carbonyl group, Ar: a phenylene group, glass transition temperature: 7° C., weight average molecular weight: 23,000, polyester resin, Eg=3.9, amorphous) (manufactured by Toyobo Co., Ltd.);

Binder resin 8: "LUPILON" (registered trademark) H-4000 (number of atoms forming the π-conjugated structure: 6, not corresponding to the general formula (1) or (2), glass transition temperature: 146° C., weight average molecular weight: 30,000, polycarbonate resin, Eg=4.4, amorphous) (manufactured by Mitsubishi Engineering-Plastics Corporation);

Binder resin 9: "PARAPET" (registered trademark) GH-S (number of atoms forming the π-conjugated structure: 0, not corresponding to the general formula (1) or (2), glass transition temperature: 104° C., weight average molecular weight: 81,000, acrylic resin, Eg=4.7, amorphous) (Kuraray Co., Ltd.);

Binder resin 10: Styrene Polymer (number of atoms forming the π-conjugated structure: 6, not corresponding to the general formula (1) or (2), glass transition temperature: 100° C., weight average molecular weight: 200,000, polystyrene, Eg=4.4, amorphous) (FUJIFILM Wako Pure Chemical Corporation).

(Preparation of Binder Resin Solution)

The binder resins and solvents were placed in a stirring vessel in the proportions shown in Table 1, and heated at 60° C. for 8 hours using an oil bath while stirring to obtain binder resin solutions 1 to 10.

(Raw Materials of Glass Powder-Containing Pastes)

Photosensitive monomer M-1: trimethylolpropane triacrylate;

Photosensitive monomer M-2: tetrapropylene glycol dimethacrylate;

Photosensitive polymer 1: a product of an addition reaction of 0.4 equivalents of glycidyl methacrylate to carboxyl groups in a copolymer of methacrylic acid/methyl methacrylate/styrene in a mass ratio of 40/40/30 (weight average molecular weight 43000; acid value 100);

Photopolymerization Initiator 1: 2-benzyl-2-dimethyl-amino-1-(4-morpholinophenyl)butanone-1 (BASF SE);

Polymerization inhibitor 1: 1,6-hexanediol-bis[(3,5-di-t-butyl-4-hydroxyphenyl)propionate]);

Ultraviolet ray absorber solution 1: a 0.3% by mass solution of Sudan IV (Tokyo Ohka Kogyo Co., Ltd.) in γ-butyrolactone;

Viscosity modifier 1: "Flownon" (registered trademark) EC121 (Kyoeisha Chemical Co., Ltd.);

Solvent 1: 7-butyrolactone;

Low-softening point glass powder 1: 27% by mass of $SiO_2$, 31% by mass of $B2O3$, 6% by mass of ZnO, 7% by mass of $Li_2O$, 2% by mass of MgO, 2% by mass of CaO, 2% by mass of BaO, 23% by mass of $Al_2O_3$; refractive index (ng) 1.56; glass softening temperature 588° C.; thermal expansion coefficient $70×10^{-1}$ $(K^{-1})$; mean particle size 2.3 μm.

(Preparation of Glass Powder-Containing Paste)

To 38 parts by mass of Solvent 2, 4 parts by mass of Photosensitive monomer M-1, 6 parts by mass of Photosensitive monomer M-2, 24 parts by mass of Photosensitive polymer 1, 6 parts by mass of Photopolymerization initiator 1, 0.2 parts by mass of Polymerization inhibitor 1, and 12.8 parts by mass of Ultraviolet ray absorber solution 1 were added and dissolved by heating at 80° C. After cooling the obtained solution, 9 parts by mass of Viscosity modifier 1 was added thereto to obtain Organic solvent 1. To 50 parts by mass of Organic solvent 1 was added 50 parts by mass of the low-softening point glass powder, and kneaded with a three-roll kneader to obtain Glass powder-containing paste 1.

(Evaluation of Decay Time of Emission Intensity)

The scintillator panels prepared in Examples and Comparative Examples were exposed to X-rays with a tube voltage of 70 kVp. The time variation of the amount of emission was measured using a system comprising an optical fiber (PLG-1-3000-8R, manufactured by Nippon P.I Co., Ltd.), a photodiode (S2281-01, manufactured by Hamamatsu Photonics K.K.), and a photosensor amplifier (C9329, manufactured by Hamamatsu Photonics K.K.). Thereafter, the time required for the emission intensity at the time when X-ray irradiation was stopped to be 1/e was determined.

(Evaluation of Lightness L* and Chromaticity a* and b*)

Using the scintillator panels prepared in Examples and Comparative Examples, a spectrocolorimeter CM-2600D (Konica Minolta, Inc.) was placed on the surface of the scintillator layer, the lightness L*, and the chromaticity a* and b* were measured at 400 to 700 nm in the SCI manner.

(Evaluation of Brightness)

The scintillator panels prepared in Examples and Comparative Examples were installed in a commercially available FPD (Paxscan 2520V, manufactured by Varian Medical Systems, Inc.) to prepare an X-ray detector. Radiation with a tube voltage of 70 kVp was delivered to the scintillator panel from its substrate side, and the brightness of the scintillator panel was detected with FPD. The brightness was calculated based on the digital value obtained from the image relative to the predetermined incident dose. Relative comparison was performed for Examples 1 to 7 and Comparative Examples 1 to 7 considering the brightness of Comparative Example 1 as 100%, for Examples 8 to 11 and Comparative Examples 8 and 9 considering the brightness of Comparative Example 8 as 100%, for Examples 12 to 16 and Comparative Examples 10 to 14 considering the brightness of Comparative Example 10 as 100%, and for Examples 17 to 19 and Comparative Examples 15 to 16 considering the brightness of Comparative Example 15 as 100%.

(Evaluation of Deterioration of Brightness Due to Continuous Irradiation)

Radiation was continuously delivered to the scintillator panel prepared in Examples and Comparative Examples for 14 days under the conditions with the dose rate being 3 kGy/h. Using the irradiated scintillator panel and an X-ray detector prepared by the method as described above, the brightness of the scintillator panel was detected with FPD. The brightness was calculated based on the digital value obtained from the image relative to the predetermined incident dose. Considering the brightness before continuous irradiation in Examples and Comparative Examples as 100%, the relative brightness after irradiation was calculated.

(Adhesion Strength of Scintillator Layer with Support)

An adhesive tape with an adhesive strength of 5N/25 mm was attached to the scintillator layer of each of the scintillator panels prepared in Examples and Comparative Examples. The tape was then peeled while keeping the peel angle 90°, and the scintillator layer was checked for chipping or cracking, or detachment from the support. This test was repeated 50 times, and the maximum number of tests that showed no chipping, cracking, or detachment in the scintillator layer was considered as adhesion strength. Those that showed no chipping, cracking, or detachment in the scintillator layer after 20 peeling were evaluated as A; those that showed no detachment until 20 peeling were done were evaluated as B; and those that showed detachment until 5 peeling were done were evaluated as C.

(Evaluation of Deterioration of Adhesion Strength Due to Continuous Irradiation)

Radiation was continuously delivered to the scintillator panel prepared in Examples and Comparative Examples for 14 days under the conditions with the dose rate being 3 kGy/h. The scintillator panel after irradiation was evaluated for the adhesion strength between the scintillator layer and the support by the method described above.

Example 1

Raw materials were charged into a stirring vessel in the proportion described in table 2 and mixed. The mixture was then deaerated for 20 minutes using a planetary mixing/deaeration system ("Mazerustar" (registered trademark) KK-400; manufactured by Kurabo Industries Ltd.) at a rotation rate of 1000 rpm to obtain Phosphor paste A-1. The obtained Phosphor paste 1 was applied to a board E20 (white PET film; Toray Industries, Inc.) using a die coater so that the thickness after drying was 200 m, and then the paste was heated and dried at 70° C. for 180 minutes to obtain a scintillator panel with a scintillator layer formed on a substrate.

Examples 2 to 11 and Comparative Examples 1 to 9

Scintillator panels were obtained in the same manner as in Example 1, except that the phosphor pastes listed in tables 2 to 4 were used instead of the phosphor paste A-1.

Example 12

(Preparation of Barrier Ribs on Substrate)

A soda glass plate of 125 mm×125 mm×0.7 mm was used as a substrate. Glass powder-containing paste 1 was applied to the substrate using a die coater so that the thickness after drying was 220 m and dried to obtain a coating film of Glass powder-containing paste 1. Then, the coating film of Glass powder-containing paste 1 was exposed at an exposure amount of 300 mJ/cm$^2$ using an ultra-high pressure mercury lamp through a photomask having an opening corresponding to the desired pattern (chromium mask having grid-like openings with a pitch of 127 μm and a line width of m). The exposed coating film was developed in a 0.5% by mass aqueous ethanolamine solution, followed by removal of the unexposed portion to obtain a grid-like pattern. The obtained grid-like pattern was fired in the air at 580° C. for 15 minutes to form a grid-like barrier ribs containing glass as a main component.

(Formation of Reflecting Layer)

Using a commercially available sputtering apparatus and a sputtering target, a metallic layer as a reflecting layer was formed on the board on which the barrier ribs were formed. With respect to the thickness of the metallic layer, sputtering was performed under such conditions that the thickness of the metallic layer on a glass plate that was placed near the board on which barrier ribs formed was 300 nm. The sputtering target used was APC (Furuya Metal Co., Ltd.), a silver alloy containing palladium and copper. After the formation of the metallic reflecting layer, SiN was formed as a protective layer in the same vacuum batch such that its thickness on the glass board was 100 nm.

(Formation of Organic Protective Layer)

One part by mass of "CYTOP" (registered trademark) CTL-809M (AGC Inc.) as an amorphous fluorine-containing resin was mixed with one part by mass of a fluorine-based solvent CT-SOLV180 (AGC Inc.) as a solvent to prepare a resin solution.

After vacuum printing of the resin solution on the board having barrier ribs, on which board a metallic reflecting layer and an inorganic protective layer were formed, the resin solution was dried at 90° C. for 1 hour, and cured at 190° C. for 1 hour to form an organic protective layer. A cross section of the barrier rib was exposed using a triple ion beam milling system EM TIC 3X (Leica Camera AG), and imaged on a field emission scanning electron microscope (FE-SEM) Merlin (Carl Zeiss AG). The measured thickness of the organic protective layer on the side of and at the center in the height direction of the barrier rib on the board having the barrier ribs was 1 m.

A phosphor paste A-11 was prepared in the same manner as in Example 1. The obtained phosphor paste A-11 was charged into barrier ribs on a board with a reflecting layer by vacuum printing, and dried at 150° C. for 30 minutes to obtain a scintillator panel with a scintillator layer formed inside the barrier ribs.

Examples 13 to 19 and Comparative Examples 10 to 16

Scintillator panels were obtained in the same manner as in Example 12, except that the phosphor pastes listed in tables 5 and 6 were used instead of the phosphor paste A-11.

The compositions and results of Examples and Comparative Examples are shown in tables 2 to 6.

TABLE 1

| | Resin solution 1 | Resin solution 2 | Resin solution 3 | Resin solution 4 | Resin solution 5 | Resin solution 6 | Resin solution 7 | Resin solution 8 | Resin solution 9 | Resin solution 10 |
|---|---|---|---|---|---|---|---|---|---|---|
| Resin name | polyester | polyester | poly-alylate | polyamide | polyamide imide | butyral | poly-ester | poly-carbonate | acryl | poly-styrene |
| Species | VYLON 103 | VYLON 270 | U-polymer type D | GRILAMID TR55 | VYLOMAXHR 15ET | S-LECBL-1 | VYLON 630 | IUPILONH-4000 | PARAPET GH-S | — |
| Number of atoms forming pi-conjugated structure | 10 | 10 | 10 | 10 | 12 | 0 | 10 | 6 | 0 | 6 |
| Weight average molecular weight | 23000 | 23000 | 60000 | 18000 | 8000 | 19000 | 23000 | 30000 | 81000 | 200000 |
| Glass transition temperature | 47 | 67 | 193 | 160 | 260 | 70 | 7 | 146 | 104 | 100 |
| Presence of aromatic in backbone | Yes | Yes | Yes | Yes | Yes | No | Yes | Yes | No | No |
| Eg | 3.9 | 3.9 | 3.5 | 4.1 | 3.5 | 3.6 | 3.9 | 4.4 | 4.7 | 4.4 |

TABLE 1-continued

|  | Resin solution 1 | Resin solution 2 | Resin solution 3 | Resin solution 4 | Resin solution 5 | Resin solution 6 | Resin solution 7 | Resin solution 8 | Resin solution 9 | Resin solution 10 |
|---|---|---|---|---|---|---|---|---|---|---|
| Transmittance (%) of 2.5% by weight solution | 98 | 97 | 99 | 99 | 91 | 95 | 98 | 98 | 99 | 96 |
| Crystalline properties | amorphous | amorphous | amorphous | amorphous | amorphous | amorphous | amorphous | amorphous | amorphous | amorphous |
| Amount prepared (part by weight) | 20 | 20 | 20 | 20 | 20 | 20 | 20 | 20 | 20 | 20 |
| Solvent | NMP | NMP | NMP | BzOH | NMP | NMP | NMP | NMP | NMP | MMB-Ac |
| Amount prepared (part by weight) | 80 | 80 | 80 | 80 | 80 | 80 | 80 | 80 | 80 | 80 |

TABLE 2

|  | Ex. 1 | Ex. 2 | Ex. 3 | Ex. 4 | Ex. 5 | Com. Ex. 1 | Com. Ex. 2 | Com. Ex. 3 | Com. Ex. 4 | Com. Ex. 5 |
|---|---|---|---|---|---|---|---|---|---|---|
| Substrate Shape | E20 sheet | E20 sheet | E20 sheet | E20 sheet | E20 sheet | E20 sheet | E20 sheet | E20 sheet | E20 sheet | E20 sheet |
| Phosphor paste | A-1 | A-2 | A-3 | A-4 | A-5 | B-1 | B-2 | B-3 | B-4 | B-5 |
| Resin solution | resin solution 1 | resin solution 2 | resin solution 3 | resin solution 4 | resin solution 5 | resin solution 6 | resin solution 7 | resin solution 8 | resin solution 9 | resin solution 10 |
| Phosphor | GOS:Tb | GOS:Tb | GOS:Tb | GOS:Tb | GOS:Tb | GOS:Tb | GOS:Tb | GOS:Tb | GOS:Tb | GOS:Tb |
| Phosphor:resin (% by volume) | 85:15 | 85:15 | 85:15 | 85:15 | 85:15 | 85:15 | 85:15 | 85:15 | 85:15 | 85:15 |
| Film thickness (μm) | 200 | 200 | 200 | 200 | 200 | 200 | 200 | 200 | 200 | 200 |
| Initial adhesion strength | A | A | A | A | A | C | B | B | C | C |
| Adhesion strength after irradiation | A | A | A | A | A | C | C | B | C | C |
| Time required for emission intensity to be 1/e (μs) | 650 | 650 | 650 | 650 | 650 | 650 | 650 | 650 | 650 | 650 |
| L* | 98 | 98 | 98 | 98 | 97 | 96 | 97 | 95 | 95 | 94 |
| a* | −0.2 | −0.2 | −0.3 | −0.2 | −1.0 | −0.7 | −0.5 | −0.4 | −0.6 | −0.5 |
| b* | 2.8 | 2.8 | 3.1 | 3.2 | 5.0 | 1.2 | 3.0 | 3.2 | 1.0 | 4.1 |
| Initial brightness | 105 | 107 | 108 | 107 | 103 | 100 | 95 | 98 | 93 | 85 |
| Brightness after irradiation | 100 | 103 | 102 | 102 | 101 | 82 | 85 | 86 | 70 | 73 |
| % change in brightness | 95% | 96% | 94% | 95% | 98% | 82% | 89% | 88% | 75% | 86% |

TABLE 3

|  | Ex. 6 | Ex. 7 | Com. Ex. 6 | Com. Ex. 7 |
|---|---|---|---|---|
| Substrate | E20 | E20 | E20 | E20 |
| Phosphor paste | A-2 | A-6 | A-2 | B-6 |
| Resin solution | resin solution 2 | resin solution 2 | resin solution 2 | resin solution 2 |
| Phosphor | GOS:Tb | GOS:Tb | GOS:Tb | GOS:Tb |
| Phosphor:resin (% by volume) | 85:15 | 70:30 | 85:15 | 85:15 |
| Film thickness (μm) | 400 | 200 | 30 | 850 |
| Initial adhesion strength | A | A | A | B |
| Adhesion strength after irradiation | A | A | A | B |
| Time required for emission intensity to be 1/e (μs) | 650 | 650 | 650 | 650 |
| Initial brightness | 108 | 104 | 83 | 130 |
| Brightness after irradiation | 103 | 100 | 80 | 116 |
| % change in brightness | 95% | 96% | 96% | 89% |

TABLE 4

|  | Ex. 8 | Ex. 9 | Ex. 10 | Ex. 11 | Com. Ex. 8 | Com. Ex. 9 |
|---|---|---|---|---|---|---|
| Substrate | E20 | E20 | E20 | E20 | E20 | E20 |
| Shape | sheet | sheet | sheet | sheet | sheet | sheet |
| Phosphor paste | A-7 | A-8 | A-9 | A-10 | B-7 | B-8 |
| Resin solution | resin solution 2 | resin solution 3 | resin solution 4 | resin solution 5 | resin solution 6 | resin solution 9 |
| Phosphor | GOS:Pr | GOS:Pr | GOS:Pr | GOS:Pr | GOS:Pr | GOS:Pr |
| Phosphor:resin (% by volume) | 85:15 | 85:15 | 85:15 | 85:15 | 85:15 | 85:15 |
| Film thickness (μm) | 200 | 200 | 200 | 200 | 200 | 200 |
| Initial adhesion strength | A | A | A | A | C | C |
| Adhesion strength after irradiation | A | A | A | A | C | C |
| Time required for emission intensity to be 1/e (μs) | 3 | 3 | 3 | 3 | 3 | 3 |
| Initial brightness | 107 | 108 | 107 | 103 | 100 | 93 |
| Brightness after irradiation | 103 | 102 | 102 | 101 | 82 | 70 |
| % change in brightness | 96% | 94% | 95% | 98% | 82% | 75% |

TABLE 5

|  | Ex. 12 | Ex. 13 | Ex. 14 | Ex. 15 | Ex. 16 | Com. Ex. 10 | Com. Ex. 11 | Com. Ex. 12 | Com. Ex. 13 | Com. Ex. 14 |
|---|---|---|---|---|---|---|---|---|---|---|
| Substrate | glass | glass | glass | glass | glass | glass | glass | glass | glass | glass |
| Shape | barrier rib | barrier rib | barrier rib | barrier rib | barrier rib | barrier rib | barrier rib | barrier rib | barrier rib | barrier rib |
| Phosphor paste | A-11 | A-12 | A-13 | A-14 | A-15 | B-9 | B-10 | B-11 | B-12 | B-13 |
| Resin solution | resin solution 1 | resin solution 2 | resin solution 3 | resin solution 4 | resin solution 5 | resin solution 6 | resin solution 7 | resin solution 8 | resin solution 9 | resin solution 10 |
| Phosphor | GOS:Tb | GOS:Tb | GOS:Tb | GOS:Tb | GOS:Tb | GOS:Tb | GOS:Tb | GOS:Tb | GOS:Tb | GOS:Tb |
| Phosphor:resin (% by volume) | 80:20 | 80:20 | 80:20 | 80:20 | 80:20 | 80:20 | 80:20 | 80:20 | 80:20 | 80:20 |
| Film thickness (μm) | 200 | 200 | 200 | 200 | 200 | 200 | 200 | 200 | 200 | 200 |
| Initial brightness | 106 | 108 | 108 | 108 | 103 | 100 | 96 | 98 | 93 | 85 |
| Brightness after irradiation | 100 | 104 | 102 | 103 | 100 | 82 | 85 | 86 | 70 | 73 |
| % change in brightness | 94% | 96% | 94% | 95% | 97% | 82% | 89% | 88% | 75% | 86% |

TABLE 6

|  | Ex. 17 | Ex. 18 | Ex. 19 | Com. Ex. 15 | Com. Ex. 16 |
|---|---|---|---|---|---|
| Substrate | glass | glass | glass | glass | glass |
| Shape | barrier rib | barrier rib | barrier rib | barrier rib | barrier rib |
| Phosphor paste | A-16 | A-17 | A-18 | B-14 | B-15 |
| Resin solution | resin solution 2 | resin solution 4 | resin solution 5 | resin solution 6 | resin solution 9 |
| Phosphor | GOS:Pr | GOS:Pr | GOS:Pr | GOS:Pr | GOS:Pr |
| Phosphor:resin (% by volume) | 80:20 | 80:20 | 80:20 | 80:20 | 80:20 |
| Film thickness (μm) | 200 | 200 | 200 | 200 | 200 |
| Initial brightness | 108 | 108 | 103 | 100 | 93 |
| Brightness after irradiation | 104 | 103 | 100 | 82 | 70 |
| % change in brightness | 96% | 95% | 97% | 82% | 75% |

DESCRIPTION OF REFERENCE SIGNS

1 X-ray detector
2 Scintillator panel
3 Output board
4 Scintillator layer
5 Substrate
6 Phosphor
7 Binder resin
8 Diaphragm layer
9 Photoelectric conversion layer
10 Output layer
11 Board
12 Power source part
13 Barrier rib

The invention claimed is:
1. A line camera comprising a scintillator panel on an output board having a photoelectric conversion layer, the scintillator panel comprising a substrate and a scintillator layer containing phosphors,
    wherein the scintillator layer comprises a binder resin having a π-conjugated structure composed of seven or more atoms;
    wherein a glass transition temperature of the binder resin is from 30 to 430° C.;
    wherein the binder resin has in its backbone a structure represented by general formula (1) or (2):

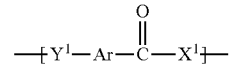

(1)

-continued

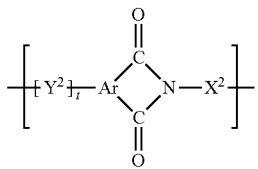
(2)

wherein in the general formulae (1) and (2), $X^1$, $X^2$, $Y^1$, and $Y^2$ each independently represents a divalent organic group; Ar represents an aromatic hydrocarbon group; and t represents an integer of 1 or 2; and the thickness of the scintillator layer is from 50 to 800 μm.

2. The line camera according to claim 1, wherein the binder resin has a π-conjugated structure composed of 30 or less atoms.

3. The line camera according to claim 1, wherein a solution containing 2.5% by weight of the binder resin has a transmittance of 85% or more at an optical path length of 1 cm and at the wavelength of 400 nm.

4. The line camera according to claim 1, wherein the energy level gap Eg between the highest occupied molecular orbital and the lowest unoccupied molecular orbital of the binder resin is from 2.0 eV to 4.2 eV.

5. The line camera according to claim 1, wherein the weight average molecular weight of the binder resin ranges from 5,000 to 100,000.

6. The line camera according to claim 1, wherein the volume ratio of the phosphors and the binder resin in the scintillator layer is as following: phosphors: binder resin=80:20 to 95:5.

7. The line camera according to claim 1, wherein the phosphors contain gadolinium oxysulfide.

8. The line camera according to claim 1, wherein the time period in which the emission intensity of the phosphors becomes l/e times the initial emission intensity is 100 μs or less.

9. The line camera according to claim 1, comprising a barrier rib for dividing the scintillator layer.

10. A radiation inspection device comprising the line camera according to claim 1.

11. The radiation inspection device according to claim 10, which is used in industrial applications.

12. A method for inspecting objects,
wherein the method uses a radiation inspection device which comprises a radiation generator that generates radiation and a radiation detector comprising the scintillator panel according to claim 1,
the radiation inspection device directs radiation from the radiation generator to an object and detects radiation passing through the object by the radiation detector, and
the method comprises;
continuously delivering radiation to the radiation detector; and
nondestructively and continuously inspecting the objects in lines.

13. An off-line inspection method using the radiation inspection device according to claim 10, wherein a tube voltage during irradiation is 70 kV or more.

* * * * *